United States Patent Office 2,889,704
Patented June 9, 1959

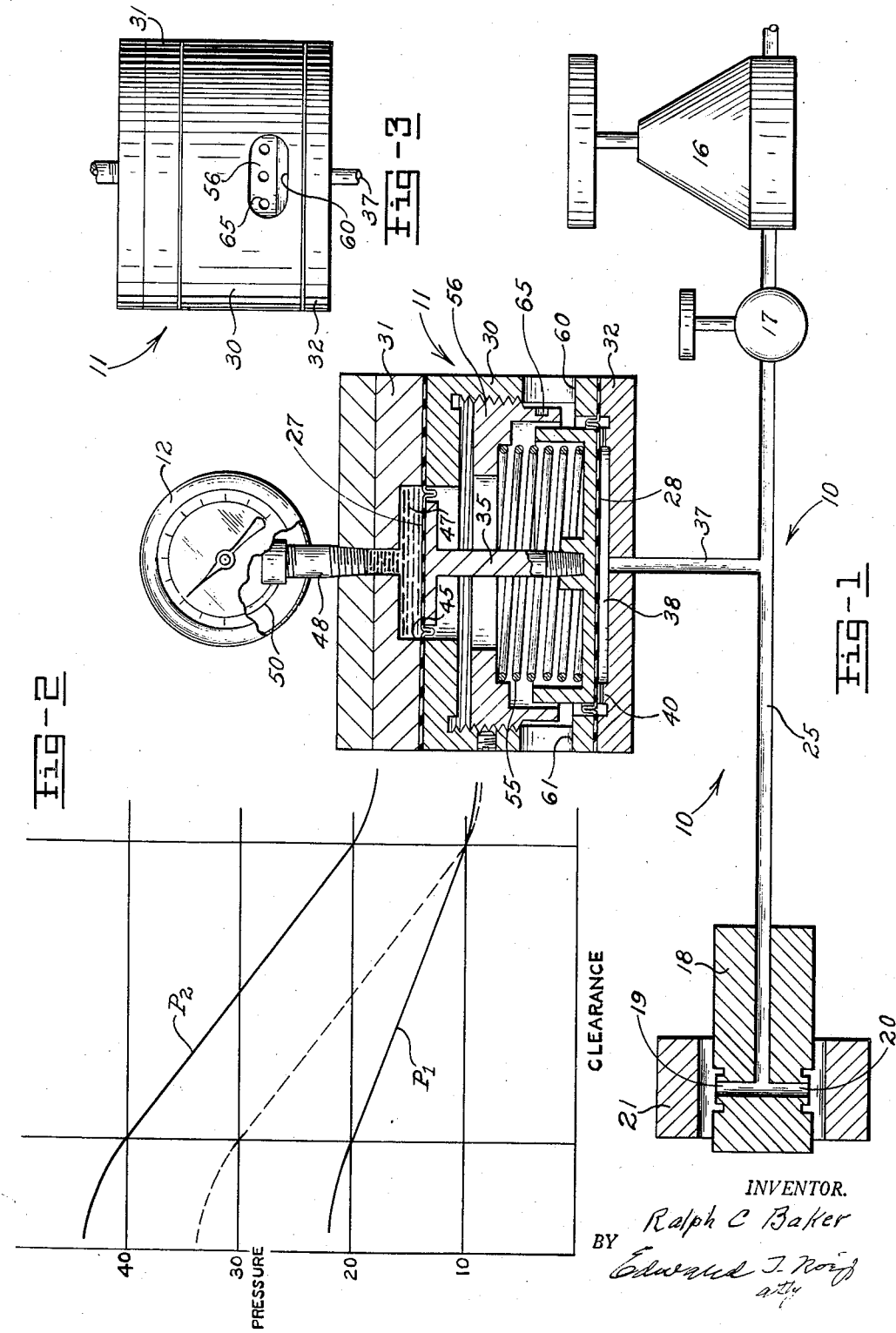

2,889,704

AMPLIFYING APPARATUS FOR GAUGING PRODUCT CHARACTERISTICS

Ralph C. Baker, Dayton, Ohio, assignor, by mesne assignments, to The Sheffield Corporation, a corporation of Delaware Application November 4, 1954, Serial No. 466,959

8 Claims. (Cl. 73—37.9)

This invention relates to pneumatic type gauging devices and more particularly to an amplifying unit for obtaining amplified changes in fluid pressure responsive to fluid pressures determined by a gauged product characteristic.

It is an object of this invention to provide an apparatus for obtaining amplified fluid pressure changes which are accurately responsive to fluid pressures determined by gauged product characteristics, the apparatus being simply conformed of a few rugged components for accurate amplification through a long service life.

It is a further object to provide such an apparatus which includes no delicately formed or wearable parts such as valves or the like operable during gauging, and which comprises a movable unit comprising two interconnected imperforate piston means of different areas, the gauging pressure being applied to the larger of the piston means and an independent closed system being provided for applying a counter pressure to the smaller of the piston means varying with the displacement of the piston unit and providing amplified pressure changes for actuating indicating means and the like.

It is a further object to provide such an apparatus wherein the piston unit comprises a pair of imperforate diaphragms, one at each end of a differential piston arrangement, each diaphragm forming one wall of a pressure chamber provided at each end of the piston unit whereby the piston arrangement is supported for pressure induced movement in a friction free manner during gauging.

It is a further object to provide such an apparatus for obtaining amplified fluid pressure changes responsive to gauging pressures wherein provision is made for obtaining the amplified pressure changes at a pressure range as desired by means of an adjustment which is simply made from the exterior of the apparatus without disassembling any of the apparatus components and whenever desired.

It is a further object to provide such an adjustment as referred to in the object mentioned above, comprising an adjustable spring means situated between the piston means of a differential piston arrangement, the piston means being imperforate and the adjustable spring means being accessible from the exterior of the apparatus for adjustment whenever desired.

It is a further object to provide an apparatus for obtaining amplified fluid pressure changes responsive to gauging pressures including a differential piston unit comprising two imperforate piston means of different areas, the gauging pressure being applied to the larger of the piston means and an independent closed fluid system providing a counter pressure on the smaller piston means, the closed fluid system providing a resilient wall portion whereby fluid pressures are applied to the smaller piston means which vary with displacements of the piston unit and in an amplified sense with respect to the gauging pressures.

Other objects and advantages of the invention will be apparent from the following description, the appended claims and the accompanying drawings, in which, Figure 1 illustrates in central section an amplifying apparatus embodying the present invention associated with a pneumatic gauging system and an indicator responsive to the amplified fluid pressure changes, Figure 2 is a graph disclosing the relationship of the pressures within the amplifying apparatus relative to the total work-to-orifice clearance in the gauging system of Figure 1, and Figure 3 is an exterior view of the amplifying apparatus of Figure 1.

In Figure 1 is illustrated a pneumatic gauging system 10 associated with an amplifying unit 11 embodying the features of this invention. The amplifying unit 11 is in turn connected to a pressure responsive indicator 12. It will be appreciated that while the amplifying unit 11 has been disclosed as connected to a particular type gauging system for gauging the internal diameter of a hole through a workpiece and is associated with a particular indicator 12, the apparatus is not restricted to the specific mechanical details disclosed or to association with such a system or indicator.

In the gauging system air from a suitable source is supplied through a conduit and passes through an adjustable regulator 16, a variable restrictor 17 and to a gauging head 18. The gauging head 18 comprises two open orifices 19 and 20 situated in opposed relationship to the wall of a cylindrical hole through a part 21. It will be noted that the open orifices 19 and 20 are depressed or "undercut" relative to the adjacent surfaces of the gauging head 18, and also have substantial clearance relative to the hole which they are gauging. These relative clearances and undercuts have been exaggerated on the drawing in order to more clearly disclose these relationships. It will be appreciated that the total clearance of the hole relative to the orifices 19 and 20 will vary the amount of fluid escaping therefrom and that the gauging pressure in conduit or gauging chamber 25, between the adjustable orifice 17 and the gauging head 18, will be responsive thereto.

The exemplary amplifying unit illustrated comprises two diaphragms 27 and 28 which are imperforate and are clamped in sealed relationship between the end faces of a central body 30 and chamber forming end plates 31 and 32 respectively. A differential piston arrangement 35 cooperates between and coordinates the movements of the diaphragms 27 and 28 forming piston means of different areas.

The gauging pressure within the gauging chamber 25 is applied through a conduit 37 into a cylindrical chamber 38 formed within end plate 32 and is effective against the exterior face of the diaphragm 28. It will be noted that the chamber 38 includes an annular upward projection 40 having radial passages therethrough, which is positioned to engage the diaphragm 28 and prevent the diaphragm 28 from engaging the upper end of the conduit 37. The projection 40 insures that the gauging pressure is effectively applied to the diaphragm 28 under all conditions. The end plate 31 provides a cylindrical depression 45 which cooperates with the exterior face of diaphragm 27 to provide a pressure chamber 47. This chamber communicates through a coupling 48 with a Bourdon tube 50 which actuates the pointer of the indicator 12. The chamber 47, coupling 48 and Bourdon tube 50 provide a liquid filled closed fluid system. The Bourdon tube 50 forms a flexible wall portion thereof which maintains a pressure against the face of diaphragm 27 which is counter to the pressure applied to the diaphragm 28 and which varies in accordance with the displacements of the interconnected piston means.

Because of the differential effective areas of the diaphragms 27 and 28, the fluid pressure changes obtained within the chamber 47 and effective to actuate the indicator 12 will be responsive in an amplified sense to the gauging pressures applied within the chamber 38.

In order to obtain these amplified pressure changes at a pressure range as desired, a supplementary means has been provided to apply a constant though adjustable pressure effective on the interconnected diaphragm and piston arrangement in a direction counter to that of the applied gauging pressure. To provide this pressure, a spring 55 is arranged coaxially about the piston arrangement 35. The spring 55 engages a rotatable spring nut 56 at its upper end and the interior face of the piston unit at its lower end. The spring nut 56 is threaded within the central body portion 30 and it will be seen that rotational adjustment thereof will vary the effective pressure of spring 55 counter to the applied gauging pressure within the chamber 38.

The spring nut 56 can be readily adjusted from the exterior of the apparatus whenever desired and without disassembling any of the components. Circumferentially disposed openings are provided at 60 and 61 in the wall of central body portion 30. Cylindrical depressions are provided as indicated at 65 in the exterior face of a lower skirt portion of the spring nut 56. A simple pointed tool inserted through either of the openings 60 or 61 and into the depressions 65 can be rocked to rotate the spring nut 56 and adjust the compressive force of the spring 55.

Figure 2 is a graph of the gauging pressure and amplified pressure plotted against the total clearance of the orifices 19 and 20 relative to the hole being gauged in exemplary illustration. It will be noted that the pressure $P_1$, which is the gauging pressure existing within the gauging chamber 25 and chamber 38 of the amplifying apparatus, has a substantial linear response range which begins with some initial orifice clearance. The upper curve indicates the response of the pressure $P_2$ within the fluid filled system comprising chamber 47, coupling 48, and Bourdon tube 50 if the effective areas of the diaphragms 27 and 28 are such as to obtain an amplification of two-to-one, and without any force being exerted by the adjustable spring 55. Because it is possible that the actual pressures $P_2$ might not lie within the effective range of an indicator or other pressure responsive means, by rotating the spring nut 55, a force C obtained by the spring 55 and the weight of the piston unit can be applied in opposition to the gauging pressure. Thus, for example, the amplified fluid pressure curve can be shifted to a position as indicated by the dotted line in Figure 2 so that the amplified changes in fluid pressure will be within the range of indicator response. It will be noted that because the amplified changes in fluid pressure are obtained through the actuation of a differential piston unit in direct response to the gauging pressures $P_1$, the amplified pressures also have a substantial linear range with a large amount of initial orifice-to-work clearance in an application such as illustrated.

Where the effective areas of the diaphragms 28 and 27 are represented by the symbols $A_1$ and $A_2$ respectively, the following relationship exists:

$$P_2 = \frac{P_1 A_1 - C}{A_2}$$

Thus it is seen that an amplifying apparatus has been provided for obtaining amplified changes in fluid pressure responsive to gauging pressures, which apparatus is characterized by its extreme simplicity and ruggedness for accurate service in gauging operations through a long service life. The apparatus comprises only a single movable differential piston arrangement supported in a friction-free manner and involves no complex passage arrangement, valves or delicately formed or wearable parts. Provision has been made for maintaining amplified pressure changes within the range of response of an indicator or the like by an adjustment which is simply made from the exterior of the apparatus without disassembling any of the apparatus components. Amplified pressure changes are obtained which are linear through a long range commencing with a substantial initial fluid flow through the gauging system.

While the form of apparatus herein described constitutes a preferred embodiment of the invention, it is to be understood that the invention is not limited thereto, and that changes may be made therein without departing from the scope of the invention which is defined in the appended claims.

What is claimed is:

1. An apparatus for obtaining amplified fluid pressure responses to fluid pressures determined by a gauged product characteristic, said apparatus comprising: fluid pressure supply means for connection to a gauging system in which fluid gauging pressures are obtained in accordance with a product characteristic, a movable differential piston unit comprising two interconnected imperforate piston means of different areas movable together, means connected to said supply means for applying the gauging pressures therein to the larger of said piston means, means providing an independent closed fluid system for applying a counter pressure to the smaller of said piston means which varies with displacement of the piston unit, gauging means operatively connected for response to the counter pressure applied to said smaller piston means, whereby the gauging means is responsive in an amplified sense to changes in gauging pressure and the product characteristic, and adjustable means operative on said unit in opposition to said gauging pressures for establishing the level of the pressure response range in said independent closed fluid system.

2. An apparatus for obtaining amplified fluid pressure responses to fluid pressures determined by a gauged product characteristic, said apparatus comprising: fluid pressure supply means for connection to a gauging system in which fluid gauging pressures are obtained in accordance with a product characteristic, pressure responsive movable means providing a pair of opposed imperforate surfaces of different effective areas movable together, a closed chamber providing fluid pressure responsive gauging means, a second chamber, flexible sealing means at the periphery of the smaller of said surfaces cooperating to form the closed chamber, flexible sealing means at the periphery of the larger of said surface areas cooperating to form said second chamber, means connecting the second chamber to said supply means for applying the gauging pressure to the larger of said surface areas, and means for applying a constant axial force on said pressure responsive means in opposition to the applied gauging pressure including manually adjustable means for setting the applied force accessible at the exterior of the apparatus, whereby the gauging means is responsive in an amplified sense to changes in the gauging pressure.

3. An apparatus for obtaining amplified fluid pressure responses to fluid pressures determined by a gauged product characteristic, said apparatus comprising: means providing a source of fluid under controlled pressure, fluid pressure supply means for connection to a gauging system in which fluid gauging pressures are obtained in accordance with a product characteristic, a differential piston unit comprising two aligned piston means movable together, the piston means being imperforate and of different effective areas, means communicating with said supply means for applying the gauging pressure to the larger of said piston means to urge it in the direction of the smaller piston means, adjustable means in said apparatus for applying a force on the piston unit in opposition to the fluid pressure applied to the larger piston means, means for applying a counter pressure to the smaller of said piston means in opposition to the pressure applied to said larger piston means which varies with displacement of the piston unit, and gauging means operatively connected for response to the counter pressure applied to said smaller piston means, whereby the gauging means is responsive in an amplified sense to changes in gauging pressure and the product characteristic.

4. An apparatus for obtaining amplified fluid pressure responses to fluid pressures determined by a gauged product characteristic, said apparatus comprising: an apparatus housing providing two aligned chambers of different cross sectional areas, a piston unit carried in said housing for movement along the axis of said chambers, said piston unit comprising a first portion movable within the smaller of said chambers and a second larger portion movable within the larger of said chambers, a pair of imperforate diaphragms, one extending across the smaller of said aligned chambers in sealed relationship therewith and cooperating with the smaller of said piston portions, the second of said diaphragms extending across the larger of said chambers in sealed relationship therewith and cooperating with the larger of said piston portions, thus forming piston means of different effective areas connected to move together, the portion of the apparatus housing between the diaphragms being open to atmosphere, fluid pressure supply means adapted for connection to a gauging system in which fluid gauging pressures are obtained in accordance with a product characteristic, means communicating with said supply means for applying the gauging pressure to the larger of said chambers and against the larger piston means, means including an independent closed fluid system in communication with the smaller of said chambers for applying a counter fluid pressure to the smaller piston means which varies with the displacement of the piston unit, gauging means operatively connected for response to the counter fluid pressure applied to the smaller diaphragm, whereby the gauging means is responsive in an amplified sense to changes in gauging pressure and the gauged product characteristic, and spring means in said housing between said diaphragms engaging said piston unit and urging it in the direction of the larger piston means, said spring means including a spring and spring retaining means threaded within the apparatus housing coaxially with said wall sections, said spring retaining means being accessible from the exterior of the apparatus housing whereby the spring pressure can be varied as desired.

5. An apparatus for obtaining amplified fluid pressure responses to fluid pressures determined by a gauged product characteristic, said apparatus comprising: a pair of parallel imperforate diaphragms, housing means providing a pair of chambers of different areas, one in sealed relationship with the outside face of each of said diaphragms, a rigid piston unit cooperating between said diaphragms and coordinating the movements thereof, means adapted for connecting the larger of said chambers to a fluid pressure gauging system whereby the pressure therein varies with a gauged product characteristic, means providing an independent closed fluid pressure system connected for applying fluid pressure to the smaller of said chambers which varies with diaphragm deflection, indicating means responsive to the pressure within the smaller chamber, whereby amplified indicator response to gauging pressure change is obtained, spring means in said apparatus coaxial with said chamber and said piston means urging said piston means toward the larger of said chambers and manually adjustable means engaging said spring means to set the pressure applied thereby.

6. An apparatus for obtaining amplified fluid pressure responses to fluid pressures determined by a dimension of a product gauged, said apparatus comprising: fluid pressure supply means adapted for connection to a gauging system in which fluid gauging pressures are obtained which vary with the gauged dimension, gauging means including a closed fluid chamber and a member movable in accordance with pressures therein, movable means providing opposed imperforate surfaces movable together under influence of pressures applied thereto, a given area of one of said surfaces forming one wall of the fluid chamber, and means connected to said supply means for applying the gauging pressure in the gauging system to a relatively larger area of the other of said surfaces for obtaining pressures in said closed chamber and movements of said member responsive in an amplified sense to changes in the gauging pressure and variations in the gauged dimension.

7. An apparatus as set forth in claim 6 wherein said closed fluid chamber is liquid filled to said one surface.

8. An apparatus for obtaining amplified fluid pressure responses to fluid pressures determined by a gauged product characteristic, said apparatus comprising: fluid pressure supply means adapted for connection to a gauging system in which fluid gauging pressures are obtained in accordance with a gauged characteristic, gauging means including a closed fluid chamber, movable means providing opposed imperforate surfaces movable together under influence of pressures applied thereto, a given area of one of said surfaces forming one wall of the fluid chamber, means connected to said supply means for applying the gauging pressure to a relatively larger area of the other of said surfaces whereby the gauging means is responsive in an amplified sense to changes in the gauging pressure and means for applying a constant force to said movable means in opposition to the gauging pressures, including manually adjustable means for readily setting the force readily accessible for adjustment.

References Cited in the file of this patent

UNITED STATES PATENTS

| | | |
|---|---|---|
| 37,794 | Shaw | Feb. 24, 1863 |
| 151,367 | Eils | May 26, 1874 |
| 1,661,995 | Brown | Mar. 6, 1928 |
| 1,938,979 | Sawtelle | Dec. 12, 1933 |
| 1,940,822 | Shinn | Dec. 26, 1933 |
| 2,013,138 | De Giers | Sept. 3, 1935 |
| 2,410,671 | Moore | Nov. 5, 1946 |
| 2,618,965 | Gray | Nov. 25, 1952 |
| 2,626,464 | Mennesson | Jan. 27, 1953 |
| 2,706,397 | Byrkett | Apr. 19, 1955 |

FOREIGN PATENTS

| | | |
|---|---|---|
| 182,368 | Great Britain | July 6, 1922 |
| 510,575 | Belgium | Oct. 9, 1953 |
| 1,057,817 | France | Nov. 4, 1953 |